United States Patent
El Hajj et al.

(10) Patent No.: US 12,463,326 B2
(45) Date of Patent: Nov. 4, 2025

(54) ANTENNA DESIGN AND ARRANGEMENT METHODOLOGIES FOR SAR AND POWER DENSITY HUMAN EXPOSURE OPTIMIZATION

(71) Applicant: Intel Corporation, Santa Clara, CA (US)

(72) Inventors: Walid El Hajj, Antibes (FR); John Roman, Hillsboro, OR (US); Nawfal Asrih, Mandelieu-la-Napoule (FR)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 18/063,100

(22) Filed: Dec. 8, 2022

(65) Prior Publication Data

US 2024/0195050 A1    Jun. 13, 2024

(51) Int. Cl.
*H01Q 1/24*       (2006.01)
*G01R 29/08*    (2006.01)

(52) U.S. Cl.
CPC ......... *H01Q 1/245* (2013.01); *G01R 29/0814* (2013.01)

(58) Field of Classification Search
CPC ............................ H01Q 1/245; G01R 29/0814
See application file for complete search history.

(56) References Cited

U.S. PATENT DOCUMENTS

| | | | |
|---|---|---|---|
| 6,741,215 B2 * | 5/2004 | Grant ................... | H01Q 1/245 343/702 |
| 6,850,785 B1 * | 2/2005 | Leyten ................. | H01Q 1/245 343/702 |
| 7,117,024 B1 * | 10/2006 | Dorfman .............. | H01Q 1/245 343/702 |
| 8,798,695 B1 * | 8/2014 | Zheng .................. | H01Q 21/28 455/575.7 |
| 2004/0017115 A1 * | 1/2004 | Ozaki ............... | G01R 29/0814 307/149 |
| 2004/0094316 A1 * | 5/2004 | Ohno ...................... | H05K 9/00 174/376 |
| 2004/0198415 A1 * | 10/2004 | Lin ..................... | H04B 1/3838 455/575.1 |
| 2004/0248523 A1 * | 12/2004 | Nishimura .............. | H01Q 3/44 455/78 |
| 2012/0231784 A1 * | 9/2012 | Kazmi .............. | H04W 36/0072 455/423 |
| 2012/0270592 A1 * | 10/2012 | Ngai ................... | H04W 52/226 455/522 |
| 2019/0157748 A1 * | 5/2019 | Ozden ..................... | H01Q 9/42 |
| 2020/0259515 A1 * | 8/2020 | Mueck ................. | H04W 4/029 |
| 2020/0267662 A1 * | 8/2020 | Godala .............. | H04W 52/367 |

(Continued)

FOREIGN PATENT DOCUMENTS

EP        4418453 A2 *   8/2024  ............. H01Q 1/243

*Primary Examiner* — Seokjin Kim
(74) *Attorney, Agent, or Firm* — Viering, Jentschura & Partner mbB

(57) ABSTRACT

Methods of arranging and designing antennas to optimize electromagnetic field distributions in the near-field region of an antenna to optimize parameters such as electric field (E-field), magnetic field (H-field), specific absorption rate (SAR), power density (PD), etc. while ensuring specific performance of the antenna in the far-field region in terms of gain, efficiency, radiation pattern, etc.

20 Claims, 9 Drawing Sheets

(56) References Cited

U.S. PATENT DOCUMENTS

| | | | | |
|---|---|---|---|---|
| 2020/0374882 | A1* | 11/2020 | Cai | H04W 72/56 |
| 2021/0175919 | A1* | 6/2021 | Badic | H04B 7/0408 |
| 2022/0116949 | A1* | 4/2022 | Nadakuduti | H04W 52/346 |
| 2022/0201622 | A1* | 6/2022 | Meyuhas | H04W 52/367 |
| 2023/0098822 | A1* | 3/2023 | Ap | H04B 7/0691 |
| | | | | 455/522 |

* cited by examiner

ANTENNA DESIGN AND ARRANGEMENT METHODOLOGIES FOR SAR AND POWER DENSITY HUMAN EXPOSURE OPTIMIZATION

TECHNICAL FIELD

This disclosure generally relates to methods for arranging an antenna for a radio communication device and a radio communication device.

BACKGROUND

With respect to many radio communication technologies, such as Fourth Generation (LTE) and Fifth Generation (5G) New Radio (NR), Wireless Local Area Network (WLAN), various limitations and constraints have been defined in order to limit exposure of radio frequency (RF) electromagnetic fields to humans. Commonly known measures include power density (PD) representing the rate of RF energy transfer per unit area and/or specific absorption rate defining the amount of RF energy absorbed by the human body. SAR measure may depend on power of RF signals transmitted by the transmitter, the body part that is in the vicinity of the antenna transmitting the RF signals, in particular in the vicinity of a transmission direction to which the antenna transmits the RF signals, and the distance between the antenna and the body part.

With the employment of multiple input multiple output (MIMO) and beamforming methods in radio communication technologies, communication operations may include transmitting multiple RF signals via multiple antennas, in which each RF signal may have a narrow direction resulting in higher RF power levels in the transmission direction. In order to operate within SAR limits defined by various regulatory entities in various jurisdictions, communication devices may implement power back-off operations in which transmission power of RF signals are limited when a human body part is present within the vicinity of antennas.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
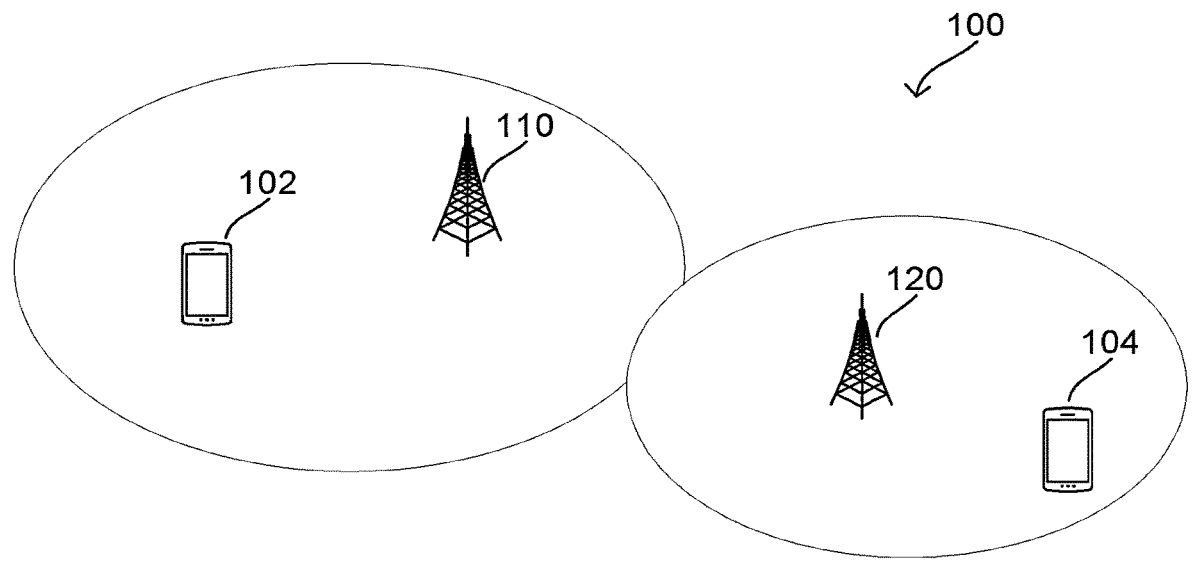
FIG. 1 shows an exemplary radio communication network.

The following detailed description 'to the accompanying drawings that show, by way of illustration, exemplary details and aspects in which aspects of the present disclosure may be practiced.

Radio communication devices employ various mechanisms to reduce RF radiation and operate in accordance with SAR or PD constraints defined by regulatory entities. In this disclosure, aspects may relate to SAR and PD measures by using the term SAR/PD indicating that aspects may be applicable for SAR and/or PD measures. One of the mechanisms may include control of communication operations based on a presence of a human body part (i.e. presence of human) within a designated proximity to antennas. A radio communication device may, reduce transmission power of radio communication signals to be transmitted by antennas, or may postpone transmission of radio communication signals for future (e.g. when the human body part is not present in the transmission directions, or for a predefined time period), which will be referred to as a back-off operation (BO). The reduction of transmission power may be referred to as power back-off (PBO), and postponement of communication may be referred to as a time back-off (TBO) in this disclosure.

There are various mechanisms employed for detection and/or triggering of a back-off operation. Some examples include a time averaged SAR, in which a radio communication device may aggregate transmission (TX) power over a defined time period and applying a BO based on the aggregated TX power and predefined limitations, such as maximum aggregated TX power defined by a particular regulatory entity. In some examples, the associated TX power to be aggregated may be assumed as the maximum TX power to derive the aggregated TX power according to period of time in which the radio communication device transmits RF signals.

In order to implement a BO operation, RF circuits (e.g. RF transmitters) of a radio communication device may be configured to operate in a BO operation mode in which TX power of radio communication signals delivered to antennas are reduced (PBO) or in which transmission of radio communication signals are postponed (TPO), and thereby keep the operation of the radio communication device within a designated SAR/PD budget (i.e. maximum allowable energy over a designated time period). The implementation of a BO operation may be provided via operations of supporting modules and components, such as proximity sensors, a processing software for sensors, measurement circuits, etc. It is also to be noted that such BO operations may reduce efficiency and performance of radio communication and reduce experience of the user of the radio communication device due to their nature.

In order to gain more headroom within the designated SAR/PD budget (e.g. a SAR/PD limit), which may be designated based on regulations brought by various regulatory entities, it may be desirable to employ further aspects to reduce the amount of the energy absorbed by human bodies based on the use case. The use case may depend on frequent usage manner of the radio communication device, such as frequent placement, direction, location, and orientation of the radio communication device relative to a radio communication node (e.g. a network access node, a peer radio communication device) with which the radio communication device may communicate frequently.

Generally, there are various aspects to be considered in terms of production costs, functionality, radio communication performance, in designing a radio communication device. Some of these aspects may require a particular consideration for a particular component included by a radio communication, such as an antenna, which may be considered as a major component in a radio communication device for overall performance of radio communication. In order to maintain the conversion between voltage and radio signals by the antenna, the arrangement of an antenna for the radio communication device may include determinations based on various specification parameters designated for the respective antenna in terms of radiation characteristic, in particular in far-field, such as gain of the antenna, efficiency of the antenna, radiation patterns. In general, an antenna may be designed in consideration of radiation characteristics in far field to ensure optimum radio communication performance, and power distribution (PD) at near-field and SAR/PD caused at the near-field may be considered as results of the antenna design.

Various aspects provided in this disclosure include arranging an antenna according to various characteristics such as SAR and PD at the near-field of the antenna in addition to the considerations attributed to the far-field of the antenna, and a wireless communication device including such an antenna, as it may be desirable to reduce SAR/PD absorption and thereby increase the headroom of the designated SAR/PD budget at an instance. Various aspects provided herein may relate to an arrangement with an intention to optimize SAR/PD characteristics of an antenna via an intrinsic antenna design properties in consideration to ensure that the radio communication performance to be provided by the antenna is at an optimum level without sacrificing far-field performance.

It is to be noted that, various aspects provided herein may replace some of existing methods used for management of radiation to ensure the radio communication operates under a designated SAR/PD limit, but it may also coexist with various existing methods, such as BO operations, proximity sensing, time averaged SAR measurements, employment of RF shields, antenna switching techniques (e.g. sounding reference signal (SRS) antenna switching technique as described in 3GPP technical specification (TS) 38.214), etc.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in a plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHZ, 3.4-3.6 GHZ, 3.6-3.8 GHZ and further frequencies and SAS=Spectrum Access System in 3.55-3.7 GHZ and further frequencies), and may use various spectrum bands including, but not limited to, IMT (International Mobile Telecommunications) spectrum (including 450-470 MHz, 790-960 MHZ, 1710-2025 MHZ, 2110-2200 MHZ, 2300-2400 MHZ, 2500-2690 MHZ, 698-790 MHZ, 610-790 MHZ, 3400-3600 MHZ, etc., where some bands may be limited to specific region(s) and/or countries), IMT-advanced spectrum, IMT-2020 spectrum (expected to include 3600-3800 MHZ, 3.5 GHz bands, 750 MHz bands, bands within the 24.25-86 GHz range, etc.), spectrum made available under FCC's "Spectrum Frontier" 5G initiative (including 27.5-28.35 GHZ, 29.1-29.25 GHZ, 31-31.3 GHZ, 37-38.6 GHZ, 38.6-40 GHZ, 42-42.5 GHZ, 57-64 GHZ, 64-71 GHZ, 71-76 GHZ, 81-86 GHZ and 92-94 GHz, etc.), the ITS (Intelligent Transport Systems) band of 5.9 GHZ (typically 5.85-5.925 GHZ) and 63-64 GHz, bands currently allocated to WiGig such as WiGig Band 1 (57.24-59.40 GHZ), WiGig Band 2 (59.40-61.56 GHz) and WiGig Band 3 (61.56-63.72 GHZ) and WiGig Band 4 (63.72-65.88 GHZ), the 70.2 GHZ-71 GHz band, any band between 65.88 GHZ and 71 GHZ, bands currently allocated to automotive radar applications such as 76-81 GHZ, and future bands including 94-300 GHZ and above. Furthermore, the apparatuses and methods described herein can also employ radio communication technologies on a secondary basis on bands such as the TV White Space bands (typically below 790 MHZ) where e.g. the 400 MHZ and 750 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception are handled by radio-layer components such as RF transceivers and antennas, and the logical transmission and reception over the software-level connection is performed by the processors or controllers. The term "communicate" encompasses one or both transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations. The term "channel state information" is used herein to refer generally to the wireless channel for wireless transmission between one or more transmitting antennas and one or more receiving antennas and may take into account any factors that affect a wireless transmission such as, but not limited to, path loss, interference, and/or blockage.

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

Figure 2:
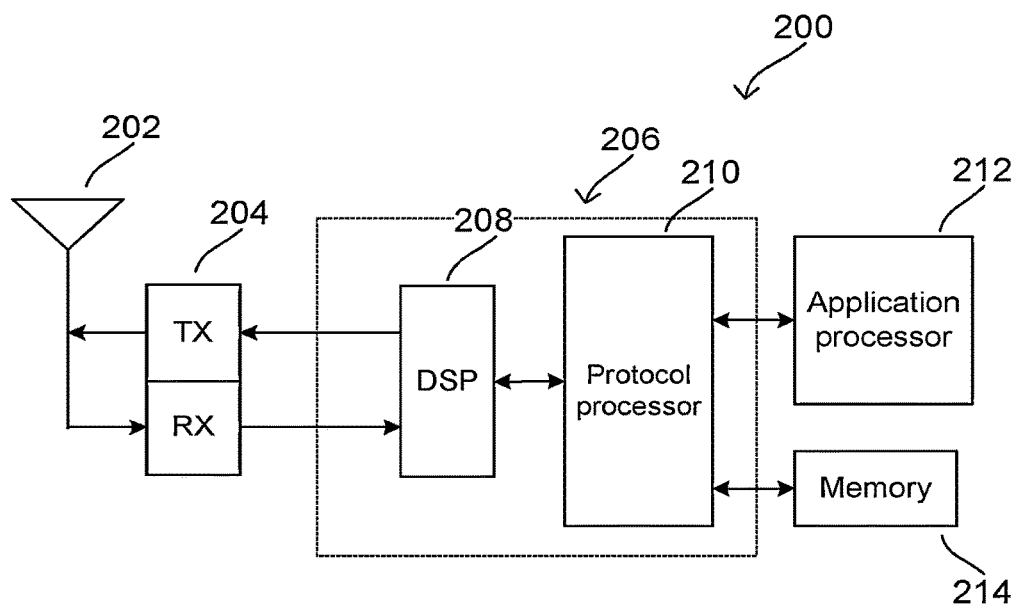
FIG. 2 shows an exemplary internal configuration of a communication device.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device according to various aspects provided in this disclosure. The communication device may include various aspects of network access nodes 110, 120 or various aspects of a terminal device 102 as well. The communication device 200 may include antenna system 202, radio frequency (RF) transceiver 204, baseband modem 206 (including digital signal processor 208 and protocol controller 210), application processor 212, and memory 214. Although not explicitly shown in FIG. 2, in some aspects communication device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Communication device 200 may transmit and receive radio signals on one or more radio access networks. Baseband modem 206 may direct such communication functionality of communication device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of communication device 200 shown in FIG. 2 depicts only a single instance of such components.

Communication device 200 may transmit and receive wireless signals with antenna system 202. Antenna system 202 may be a single antenna or may include one or more antenna arrays that each include multiple antenna elements. For example, antenna system 202 may include an antenna array at the top of communication device 200 and a second antenna array at the bottom of communication device 200. In some aspects, antenna system 202 may additionally include analog antenna combination and/or beamforming circuitry. The antenna system 202 may include at least one antenna arranged according to various aspects provided herein.

In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Communication device 200 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of communication device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of communication device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio communication device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Communication device 200 may also include application processor 212 and memory 214. Application processor 212 may be a CPU, and may be configured to handle the layers above the protocol stack, including the transport and application layers. Application processor 212 may be configured to execute various applications and/or programs of communication device 200 at an application layer of communication device 200, such as an operating system (OS), a user interface (UI) for supporting user interaction with communication device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of communication device 200, such as a hard drive or another such permanent memory device. Although not explicitly depicted in FIG. 2, the various other components of communication device 200 shown in FIG. 2 may additionally cach include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
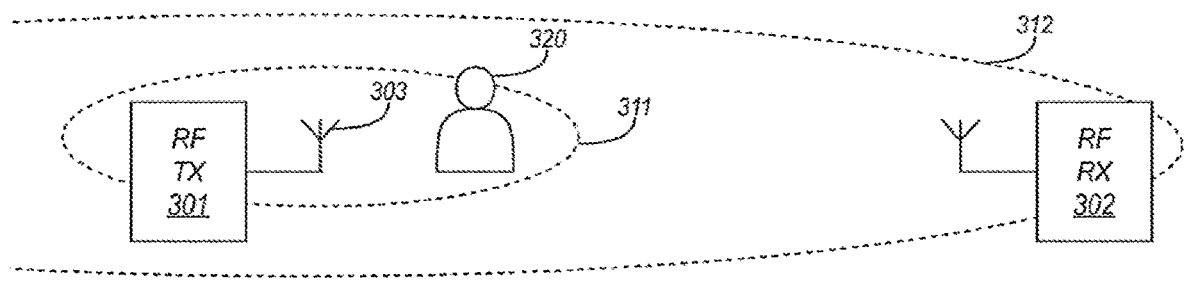
FIG. 3 shows an exemplary illustration of a radio communication environment.

FIG. 3 shows an exemplary illustration of a radio communication environment. In this illustrative example, a radio communication device (e.g. communication device 200) including an RF transmitter 301 may be configured to communicate with a further communication device including an RF receiver 302 via radio communication by transmitting radio communication signals from its antenna 303.

The antenna 303 may be any type of antenna that is suitable to transmit radio communication signals based on designated characteristics of the radio communication technology to be used by the radio communication device. The RF transmitter 301 may provide electric currents to the antenna 303, which may act as an interface between the RF transmitter 301 and the air, and it radiates, via a radiating element of the antenna 303, the energy received from provided electric currents as electromagnetic waves. The antenna 303 may include a single radiating element. In various examples, the antenna 303 may include multiple radiating elements that are configured to act as a single antenna, such as an antenna array.

The antenna 303 may be a directional antenna that is configured to radiate at particular directions greater than remaining directions. Directional antennas may be desirable to employ performance improvement in terms of power and efficiency, as they may concentrate the radiation in desired directions. The antenna 303 may be an omnidirectional antenna that is configured to radiate with equal or substantially equal power in all directions perpendicular to an axis and the radiation power varies with angle to the axis reaching to zero on the axis.

Exemplary antenna types for radio communication (e.g. the antenna 303) may, based on designated directional characteristic, include a dipole antenna, such as a microstrip patch antenna or a bow-tie antenna, a monopole antenna, such as a whip antenna, a ground plane, or an inverted-F antenna, a traveling wave antenna, such as a helical antenna, an array antenna, such as a phased array antenna, etc.

The antenna 303 may have various characteristics (e.g. performance measures) depending on the radio communication technology or other constraints associated with characteristics of the RF transmitter 301. These characteristics may provide indication with respect to how the antenna 303 radiates radio waves, which may also be referred to as radiation characteristics. One of the main characteristic of an antenna (e.g. the antenna 303) may be the gain parameter, which indicates a degree of directivity of the radiation pattern of the antenna. A further characteristic may be the bandwidth of the antenna, which indicates the frequency range which the antenna may perform transmissions optimally. Another characteristic may be the radiation pattern of the antenna indicating relative field strength of radio waves which the antenna emits at different angles (i.e. at different directions relative to the antenna) in the far-field. Furthermore, in order to ensure maximum transfer of power, the impedance of the antenna is a further characteristic to match with the transmission line of the associated RF transmitter.

Resulting from a natural occurrence of electromagnetic radiation from an antenna, a radio wave transmitted by the antenna may have certain characteristics at different regions of the volume surrounding the antenna. In this illustrative example, the antenna 305 has a near-field region and a far-field region. A two dimensional slice of the near-field region 311 is illustrated and a two dimensional slice of the far-field region 312 is illustrated. The antenna 305 may be illustrated as an omnidirectional antenna.

A far-field region is a volume in space (relative to the antenna), in which the electromagnetic (EM) waves (e.g. radio waves) may propagate through, at least dominantly. It may also be referred to as radiation-zone field. The EM waves may have synchronized oscillations of respective electric fields and magnetic fields that may oscillate perpendicularly that are perpendicular to the propagation direction of the EM wave in a homogenous, isotropic medium. The radiated power may decrease based on the square of distance from the antenna.

A near-field region is a volume in space (relative to the antenna), in which effects caused by current and charges in the antenna (e.g. inductive and capacitive effects) may cause the components of the EM waves act differently from the propagation of the EM waves in the far-field region. In the near-field region, the relationship between the electric fields and the magnetic fields may become complex and unpredictable. It is generally accepted that the EM wave is not properly formed in the near-field, since the electric fields and magnetic fields are not properly aligned. The radiated power may decrease more rapidly than the decrease of radiated power in the far-field region.

It is to be noted that the boundary between a near-field region and a far-field region may be defined hypothetically, and these regions may simply define the respective volumes, in which the EM waves induced by the antenna behave in such respective manner dominantly. The general accepted practice is that the regions may be defined as a distance relative from the antenna (i.e. radiating element of the antenna) based on a fixed numbers of wavelength of the EM wave. For an electromagnetically short antenna, the near-field region may be, or may include, a distance of one wavelength relative to the radiating element of the antenna (e.g. for a 1 GHz signal, ~30 centimeters), while for an electromagnetically long antenna, the near-field region may be, or may include, the Fraunhofer distance which may be formulated as $d=2D^2/\lambda$, D denoting the largest dimension of the radiating element and $\lambda$ denoting the wavelength.

There are various aspects which the SAR/PD measure, being a measure defined for energy absorbed per unit mass by a human body exposed to an RF electromagnetic field, may depend to. SAR/PD measure for a sample (e.g. a human body part) may be based on electrical conductivity of the sample, density of the sample, volume of the sample, and the strength of electric field absorbed by the sample. Exemplarily, SAR can be calculated with an equation below, noting that being based on magnitude of the electric field, $\sigma$ denoting sample electrical conductivity, E denoting root mean square (RMS) electric field, $\rho$ denoting sample density, and V denoting the volume of the sample:

$$SAR = \frac{1}{V}\int_{sample} \frac{\sigma(r)|E(r)|^2}{\rho(r)}$$

Considering negative effects of absorption of radio waves transmitted by radio communication devices, SAR/PD-related measurements are being used to ensure that radio communication devices operate under designated SAR/PD limits. In particular under consideration of regulatory SAR/PD limits that may be defined based on particular SAR/PD-related measurement conditions that may be based on particular distance relative to the radio communication device or the radiating element and/or based on particular orientation relative to the radio communication device or the radiating element and/or based on signal propagation characteristics. Furthermore, the radio communication device may be arranged to reduce SAR/PD absorption at a particular orientation and/or distance based on frequent usage manner of the radio communication device. For example, it may be desired for a mobile phone to reduce SAR/PD absorption at a propagation direction approximately towards a volume definable by the user's head relative to the radiating element when the mobile phone is held such that the earpiece of the mobile phone is next to the ear of a human.

Propagation characteristics of EM waves (e.g. the radio waves) may also depend on the medium that the EM waves. When an EM wave enters from a first medium into a second medium, certain characteristics of the EM wave including electric field characteristics may change. In particular, considering the boundary conditions for EM waves, the magnitude of the electric field is incident to second medium from the first medium may change depending on the relative permittivity between the mediums.

Figure 4:
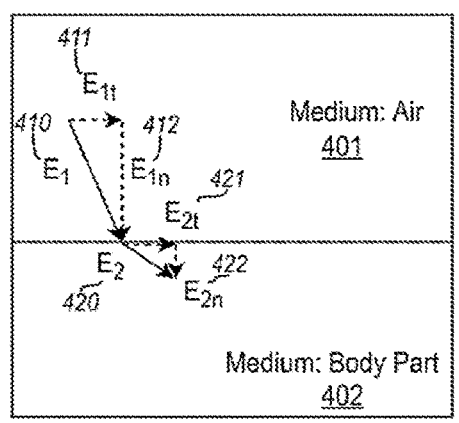
FIG. 4 shows an exemplary illustration of a two-dimensional propagation of an electric field from a first medium into a second medium.

FIG. 4 shows an exemplary illustration of a two-dimensional propagation of an electric field from a first medium into a second medium. Within the context of aspects related to reducing SAR/PD, the first medium 401 is depicted as air having a permittivity of 1, and the second medium 402 is depicted as a human body part having a permittivity greater than 30, with an intention to illustrate a propagation of radio waves transmitted by an antenna to the air. An EM-wave propagating at a propagation direction relative to the radiating element of the antenna may have encountered the human body part. Accordingly, characteristics of the respective electric field of the EM wave may change according to boundary conditions defined in electromagnetic theory.

Assuming that an electric field induced by an antenna is incident to the second medium 402 from the first medium 401 represented as an electric field vector $E_1$ 410, the electric field vector $E_1$ may be considered as a sum of its normal incident electric field vector $E_{1n}$ 412, that is normal to the surface defined by the human body part, and its tangential electric field vector $E_{1t}$ 411, that is tangential to the surface. $E_2$ 420 denotes the electric field propagating through the second medium 402 that may be considered as a sum of its normal incident electric field vector $E_{2n}$ 422, that is normal to the surface, and its tangential electric field vector $E_{1t}$ 421, that is tangential to the surface. It is known from electromagnetic theory that the normal incident electric field vector $E_{1n}$ 412 attenuates due to relative permittivity of the mediums 401, 402. On the other hand, the tangential electric field vector $E_{1t}$ 411 does not encounter such an attenuation, thereby contribute to the SAR absorbed by the second medium more than the contribution of the normal component.

In other words, according to the electromagnetic theory, $E_{1t}=E_{2t}$ and $D_{1n}=D_{2n}$, thereby $E_{1n}=(\varepsilon_{r1}/\varepsilon_{r2}) E_{2n}$. $E_{1t}$ denoting tangential component of the incident electric field vector 411. $E_{2t}$ denoting tangential component of the propagating electric field vector 421, $D_{1n}$ denoting normal component of the incident electric displacement field, $D_{2n}$ denoting normal component of the propagating electric displacement field, $E_{1n}$ denoting normal component of the incident electric field 412, $E_{2n}$ denoting normal component of the propagating electric field 422, $\varepsilon_{r1}$ denoting the permittivity of the first medium 401, and $\varepsilon_{r2}$ denoting the permittivity of the second medium 402.

Since the permittivity of the first medium 401 being air is negligible compared to the permittivity of the second medium 402 being the human body part, the normal component of the incident electric field $E_{1n}$ 412 attenuates at the interface of the second medium. Accordingly, the tangential component of the incident electric field $E_{1t}$ 411 may be considered as it contributes to the SAR or the PD associated with the respective EM wave more than the normal component of the incident electric field $E_{1n}$ 412.

Accordingly, it may be desirable for an antenna to reduce or minimize the magnitude of the tangential component at an antenna while keeping an acceptable electric field magnitude for communication. Thereby, the SAR/PD value of the antenna may be reduced while conserving similar radiation characteristic. Through reducing the magnitude of the tangential component of the incident electric field, SAR absorption of the human body part may be reduced, and the radio communication performance may be kept at an optimum level. Furthermore, the costs caused by implementing complex SAR/PD-related methods may be reduced. The techniques provided here may provide guidance to manufacturers for optimized SAR/PD antenna designs and techniques may be applicable to any radio communication technology, in particular used in mobile radio communication, such as LTE, 5G, WLAN, Wi-Fi, etc.

For arranging an antenna for a radio communication device, as provided with respect to various aspects of an antenna design, a method may include determination of major characteristics of the antenna, such as the radiation direction, gain, bandwidth, etc. based on the attributes associated with the radio communication technology and features of the radio communication device. For example, a radio communication device may include a designated space within which the antenna can be deployed, and such attributes due to spatial constraints may affect the arrangement of the antenna for the radio communication device. Furthermore, due to the radio communication technology to be employed, it may be desirable to employ an omnidirectional antenna, for example for a WLAN radio communication device, in which radio waves transmitted by the antenna propagate substantially equally over each direction perpendicular to an axis, and the radiation power varies with angle to the axis reaching to zero on the axis, resembling a doughnut shape. For certain applications it may be desirable to employ a directional antenna.

In accordance with various aspects provided herein, SAR/PD reduction techniques may be provided for a particular region in the space considering tangential components of induced electric fields over radio waves transmitted by a radio communication device. Therefore, aspects provided herein may include determining the particular region in the space, which may be defined relative to the radiating element of the antenna. This particular region may be referred to as a SAR-sensitive region, representing the region in the space designated for reducing the energy absorbed when exposed to radio waves. The SAR-sensitive region may be a two dimensional region or a three dimensional region within the near-field region of the antenna, which may be defined relative to the radiating element.

Although it may be possible to designate the SAR-sensitive region for the radio communication device arbitrarily, a more proper approach may include determination of the SAR-sensitive region based on aspects related to the radio transmission, a position of designated space of the radio communication device in which the antenna is to be deployed, relative to the radio communication device itself and/or a possible relative position of the corresponding radio receiver configured to receive radio transmissions from the radio communication device. Considering the directions which radio waves are to be propagated, the determination of the SAR-sensitive region may also include possible positions of a human body part that may be located in one or more propagation directions relative to the antenna.

Figure 5:
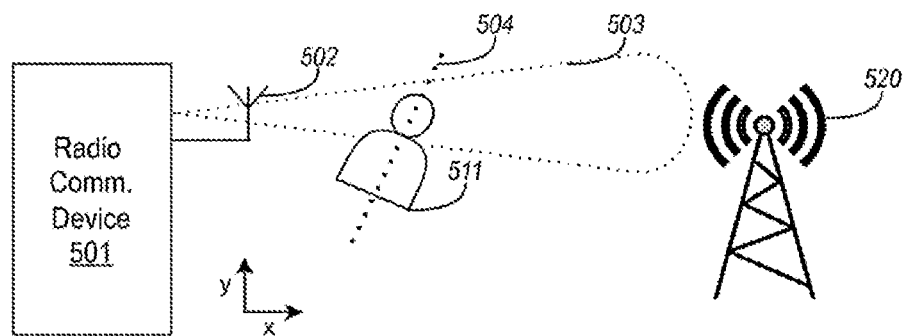
FIG. 5 exemplarily illustrates various aspects related to arranging an antenna for a radio communication device.

FIG. 5 exemplarily illustrates various aspects related to arranging an antenna for a radio communication device. Exemplarily, the radio communication device 501 may include a space designated for an omnidirectional antenna to be deployed. An antenna arrangement method may include determining a SAR-sensitive region relative to the radio communication device 501, and in particular relative to the space in which an antenna (e.g. the antenna 502) is to be deployed. As an example, for a radio communication device being a mobile phone, the SAR-sensitive region may be considered as a surface or a volume that is expected to be the spatially closest to a human body part in a normal usage, which may exemplarily be when the user of the mobile phone puts the earpiece of the mobile phone on the ear for example to make a call. For such a constellation, the SAR-sensitive region may be defined as a surface or a volume immediately after the surface of the mobile phone having an opening for the earpiece.

An antenna arrangement method may further include determining radiation characteristics of the antenna 502. The determination of radiation characteristics may include consideration of various constraints to communicate with a further wireless communication device (e.g. a network access node). Accordingly, radiation characteristics of the antenna in the far-field region, such as gain of the antenna, radiation pattern of the antenna, an efficiency of the antenna may be designated. In some examples, such characteristics may depend on a selection of the antenna, and a selected antenna may result in predefined radiation characteristics for the antenna arrangement.

The antenna arrangement method may further include controlling electromagnetic field distributions at the SAR-sensitive region in the near-field region of the antenna 502 to optimize RF radiation at the region. Through control of electromagnetic field distributions at the SAR-sensitive region, the SAR/PD at the SAR-sensitive region may be reduced or minimized. In other words, the antenna arrangement method may include, for arranging the antenna 502, controlling EM field distributions at the SAR-sensitive region, such that a measure of SAR/PD at the SAR-sensitive region is optimized (e.g. reduced), such that desired radiation characteristics expected from the antenna 502 at the far-field region is still maintained. Optimization may include an optimization of at least one of electric field, magnetic field, specific absorption rate, or power distribution at the SAR-sensitive region. A control of electromagnetic field distributions at the SAR-sensitive region may include using different antenna configurations, which may involve measurements. Through use of different antenna configurations of the antenna 802, electromagnetic field distributions at the SAR-sensitive region may be deducted. In accordance with various aspects provided herein, the control of electromagnetic field distributions at the SAR-sensitive region may include arranging the antenna 502 based on RF signal transmissions in a propagation direction, in particular according to a tangential electric field that is incident to the SAR-sensitive region.

It is to be noted that various aspects provided herein may include illustrated examples that are disclosed as two-dimensional examples in terms of spatial relationship between provided entities, such as antenna, radio communication device, radiation patterns, propagation directions, orientations, surfaces, etc. for brevity. The skilled person would recognize that implementation of such aspects may also be desirable via a three-dimensional approach which the skilled person may apply using the general knowledge.

For determination of the SAR-sensitive region, methods may include determining a particular direction in which RF signals transmitted by the antenna are to be propagated (i.e. propagation direction). The determined propagation direction may be a coarse direction which may include determination of the propagation direction relative to the radio communication device. The determined propagation direction may include a direction that is relative to a space at which the antenna is to be deployed to the radio communication device. In the illustrative example, a propagation direction 503 is illustrated as a two dimensional slice of a conical shape, which may resemble a propagation direction of radio waves to be transmitted from the radio communication device occupying a predetermined space relative to a network access node 520 for an antenna 502 having a predefined radiation pattern.

For determination of the SAR-sensitive region, methods may further include a determination of an orientation for a surface representative of a human body part within the propagation direction. The determined orientation may be relative to the propagation direction. In the illustrative example, an orientation 504 is illustrated as a two dimensional orientation intersecting the propagation direction 503, in a manner that may represent a position of a surface of a human body part 511 relative to the propagation direction 503. The orientation 504 may be an orientation that is tangential to a particular point of the surface. The human body part may be any portion of a human body, such as head, a hand, an arm, a finger, etc.

In various aspects, the determination of the orientation for the surface representative of the human body part may include a determination of the orientation within the near-field region of the antenna 502. The determination of the near-field region of the antenna 502 may be based on the wavelength of radio waves which the antenna 502 may be configured to transmit. Furthermore, the determination of the orientation for the surface may further include a determination of a distance for the surface that is relative to the radio communication device 501 or to the antenna 502. Accordingly, the determined distance may be within the near-field region of the antenna 502.

In accordance with various aspects provided within this disclosure, methods may include arranging the antenna 502 for RF signal transmissions to reduce absorption of the radiation of the antenna 502 at the SAR-sensitive region by controlling the tangential component of an electric field incident towards the determined orientation. Controlling of the tangential component of the incident electric field may include reducing the magnitude of the tangential component by arranging the antenna 502 or implementing a particular attenuating element that is configured to reduce the magnitude of the tangential component of the respective incident electric field.

Methods may further include minimizing the magnitude of the tangential component of the electric field that is incident to the human body part represented with at least the determined orientation, and optionally with also the determined distance. The minimization of the magnitude of the tangential component of the electric field may be based on determination to minimize the tangential component of the electric field to be induced by the antenna 502 based on predefined constraints associated with the far-field region of the antenna 502, in particular with respect to constraints of the performance of the radio communication, such as bandwidth, radiation pattern, gain, etc.

In accordance with various aspects, arranging the antenna 502 may include determining and/or modifying the spatial characteristics (surface, length, orientation, position) of a radiating element of the antenna 502 in a manner that the magnitude of the tangential component of the incident electric field to the SAR-sensitive region (i.e. at least a surface based on determined orientation and optionally distance) is reduced according to an earlier spatial characteristics of the antenna 502 before the modification. In some examples, the modification may include modifying the spatial structure to reduce, or control, the induced electric field that is perpendicular to the propagation vector of a transmitted RF signal. In accordance with various aspects, arranging the antenna 502 may include using algorithms to tune the dimensions of the antenna 502 with given optimization targets aiming to minimize the magnitude of the tangential component of the incident electric field at the determined distance. In accordance with various aspects, arranging the antenna 502 may include using antenna types with a larger degree of freedom in antenna design parameters that may be configured to reduce the magnitude of the tangential component of the incident electric field. Accordingly, arranging the antenna 502 may further include determining antenna design parameters, which may include gain, radiation pattern, deployment position and/or orientation (e.g. relative to the radio communication device), etc. to reduce or minimize the magnitude of the tangential component of the incident electric field.

The arrangement of the antenna 502 may include modelling the propagation of the RF signals to be transmitted by the antenna 502 and calculating a magnitude of the tangential component of the incident electric field to be induced based on the modelled propagation and one or more antenna design parameters. In an example, the propagation of the RF signal may be modelled according to far-field radio wave propagation for approximation. Furthermore, methods may include modelling the propagation of the RF signals within the near-field region. Exemplarily, by calculating the magnitude of the tangential component of the incident electric field for multiple antenna configurations, each antenna configuration may refer to a set of designated antenna design parameters, arranging the antenna 502 may include selecting one of the antenna configurations in which the magnitude of the tangential component is minimum, or at least lower than at least another one of the antenna configurations.

In various aspects, the arrangement of the antenna 502 may include attenuating the tangential component of the induced electric field. For example, the antenna 502 may include a radiating element configured to induce electric field and an attenuating element configured to attenuate the induced electric field, such that the magnitude of the tangential component of the electric field incident to the SAR-sensitive region is reduced. For example, the attenuating element may be configured to attenuate the induced electric field such that the tangential component of the incident electric field is attenuated more than the normal component of the incident electric field.

In various examples, the arrangement of the antenna 502 may include performing a measurement for each antenna configuration of a plurality of antenna configuration, in which each antenna configuration may refer to an antenna configuration with an attenuating element configuration that is different from another antenna configuration with a different attenuating element configuration. Attenuating element configurations may include different spatial features associated with the attenuating element (e.g. positions, orientations, dimensions relative to the radiating element of the antenna 502). In some aspects, in consideration of the implementation and/or selection of a particular attenuating element configuration, the arrangement of the antenna 502 may include increasing the power of the RF signal provided to the antenna to compensate with the attenuation.

In various examples, the arrangement of the antenna 502 may be based on a surface area oriented in the space relative to the propagation direction. Considering that radio waves may propagate along the determined propagation direction and accordingly induced electric fields may be incident to the surface area with different incidence angles, the arrangement of the antenna 502 may include arranging the antenna for RF signal transmissions in the propagation direction based on a combination of tangential components of multiple electric fields incident to the surface area.

Figure 6:
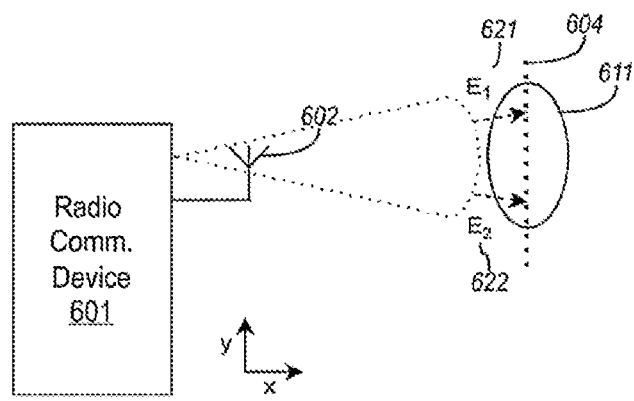
FIG. 6 exemplarily illustrates various aspects related to arranging an antenna for a radio communication device.

FIG. 6 exemplarily illustrates various aspects related to arranging an antenna for a radio communication device. In this illustrative example, similar aspects provided for the radio communication device 501, the antenna 502, and the orientation 504 with respect to FIG. 5 may also apply for the radio communication device 601, the antenna 602, and the orientation 604 determined relative to the propagation direction. In this illustrative example, methods may further include arranging the antenna 602 based on a combination of tangential components of multiple electric fields incident to the surface area 611 based on which the orientation 604 is determined. In this illustrative example, the surface area 611 may represent the SAR-sensitive region.

Considering that the propagation direction is illustrated, analogously to the propagation direction 503, as a two dimensional slice of a conical shape, which may resemble a propagation direction of radio waves to be transmitted from the radio communication device occupying a predetermined space relative to a receiver for the antenna 602 having a predefined radiation pattern, and determination of the surface area 611 as the SAR-sensitive region, the determined orientation 604 may represent the orientation of the surface area 611 relative to the propagation direction.

In accordance with various aspects provided within this disclosure, methods may include arranging the antenna 602 for RF signal transmissions to reduce absorption of the radiation of the antenna 602 at the SAR-sensitive region by controlling the tangential components of multiple electric fields that are incident to the surface area 611. Controlling of the tangential components of multiple incident electric fields may include reducing the total magnitude of the tangential components of a combination of incident electric fields by arranging the antenna 502 or implementing a particular attenuating element that is configured to reduce the total magnitude of the tangential components of the combination of incident electric fields.

Methods may further include minimizing the total magnitude of the tangential components of a combination of electric fields that are incident to the surface area 611 based the distance for the respective electric fields. The minimization of the total magnitude of the tangential components of the combination of the electric fields may be based on determination to minimize the tangential components of the electric fields to be induced by the antenna 502 based on predefined constraints associated with the far-field region of the antenna 502, in particular with respect to constraints of the performance of the radio communication, such as bandwidth, radiation pattern, gain, etc.

In accordance with various aspects, arranging the antenna 502 may include determining and/or modifying the spatial characteristics (surface, length, orientation, position) of a radiating element of the antenna 502 in a manner that the total magnitude of the tangential components of a combined incident electric fields to the SAR-sensitive region (i.e. to the surface area 611 and based on the distance between the antenna 602 and the surface area 611) is reduced according to an earlier spatial characteristics of the antenna 602 before the modification. In some examples, the modification may include modifying the spatial structure to reduce, or control, the induced electric field that is perpendicular to the propagation vector of a transmitted RF signal. In accordance with various aspects, arranging the antenna 602 may include using algorithms to tune the dimensions of the antenna 602 with given optimization targets aiming to minimize the total magnitude of the tangential components of the incident electric fields at the distance. In accordance with various aspects, arranging the antenna 602 may include using antenna types with a larger degree of freedom in antenna design parameters that may be configured to reduce the total magnitude of the tangential components of the incident electric fields. Accordingly, arranging the antenna 602 may further include determining antenna design parameters, which may include antenna characteristics such as gain, radiation pattern, deployment position and/or orientation (e.g. relative to the radio communication device), etc. to reduce or minimize the total magnitude of the tangential components of a combination of incident electric fields.

The arrangement of the antenna 602 may include modelling the propagation of the RF signals to be transmitted by the antenna 602 and calculating a magnitude of the tangential component of each incident electric field of a combination of electric fields to be induced based on the modelled propagation and one or more antenna design parameters. In various aspects, the arrangement of the antenna 502 may include attenuating the tangential components of the induced electric fields. For example, the antenna 502 may include a radiating element configured to induce electric fields and an attenuating element configured to attenuate the induced electric fields, such that the total magnitude of the tangential components of a combination of electric fields incident to the SAR-sensitive region is reduced. For example, the attenuating element may be configured to attenuate the induced electric field such that the tangential components of a combination of the incident electric fields are attenuated more than the normal components of the combination of the incident electric fields. The method may further include measurements as exemplarily provided for FIG. 5.

Illustratively, the combination of the incident electric fields may include at least two incident electric fields that are illustrated as a first electric field 621 and a second electric field 622. The combination may include further electric fields that are incident to the surface area 611. The total magnitude of the tangential components for the combination may include a sum of the magnitude of the tangential component of the first electric field 621 and the magnitude of the tangential component of the second electric field 622 (and for further electric fields if they are included in the combination).

Figure 7A:
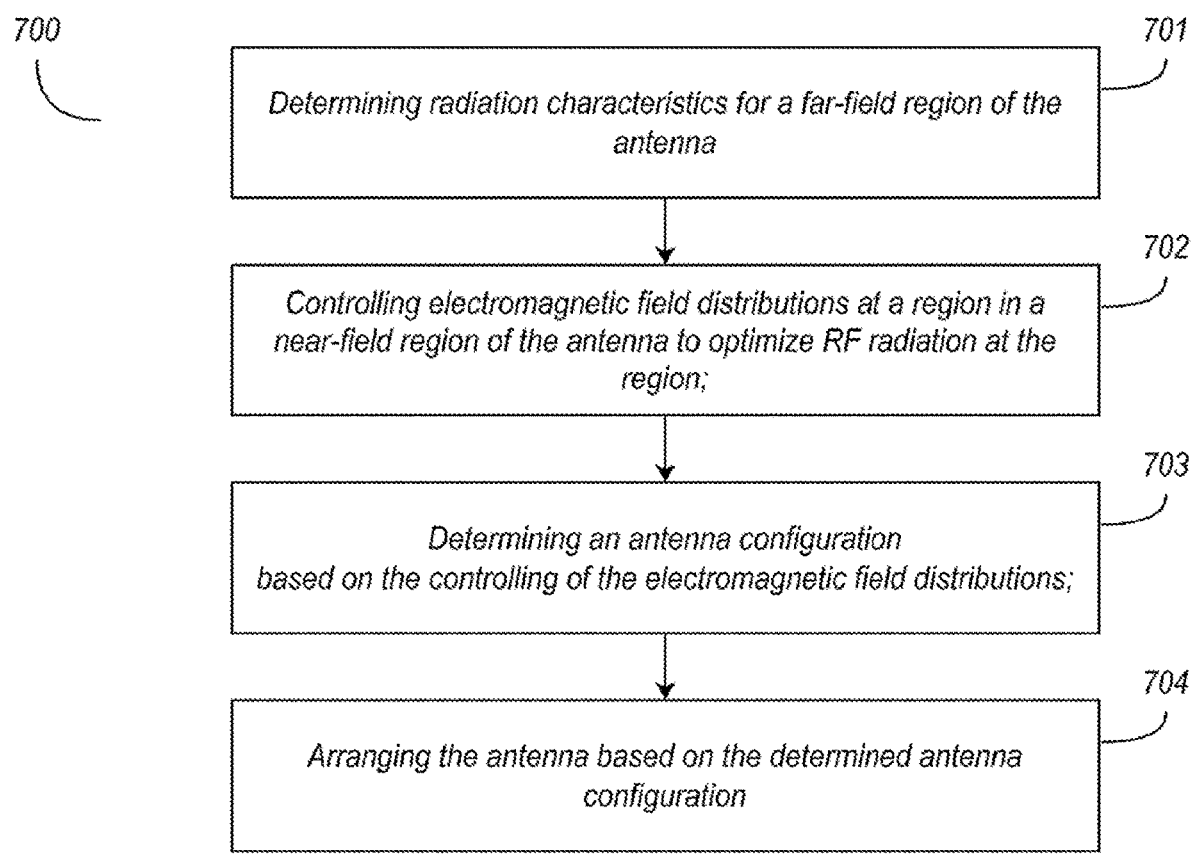
FIG. 7A shows an example of a method.

FIG. 7A shows an example of a method. The method 700 may include determining 701 radiation characteristics for a far-field region of the antenna, controlling 702 electromagnetic field distributions at a region in a near-field region of the antenna to optimize RF radiation at the region, determining 703 an antenna configuration based on the controlling of the electromagnetic field distributions; and arranging 704 the antenna based on the determined antenna configuration.

Figure 7B:
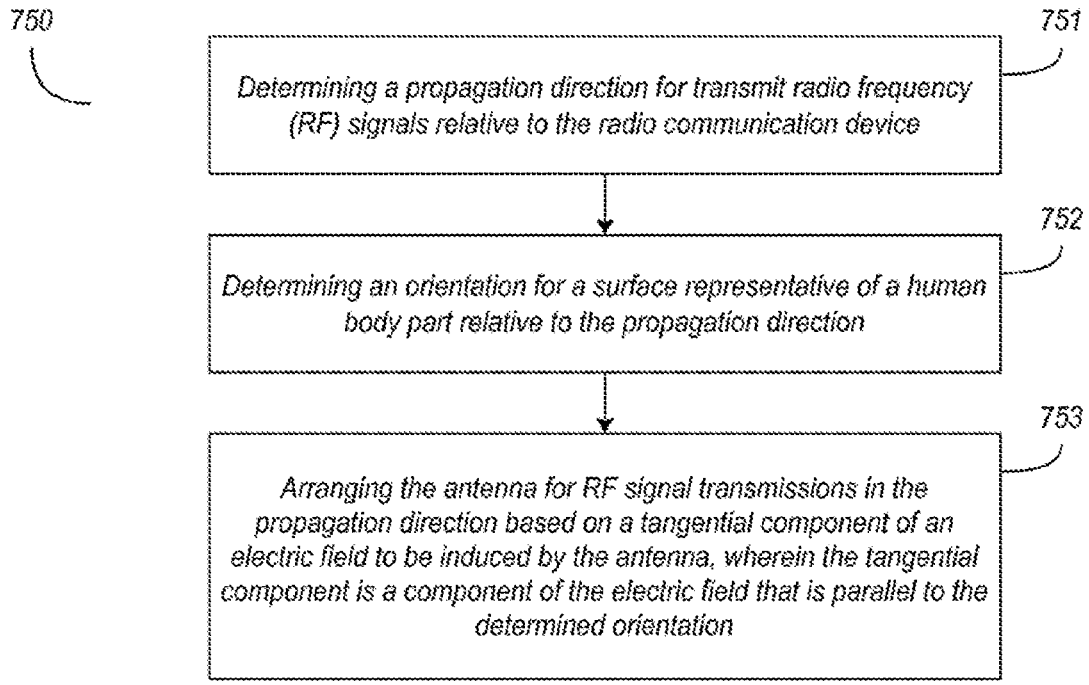
FIG. 7B shows an example of a method.

FIG. 7B shows an example of a method, which may be employed in particular for controlling electromagnetic field distributions at a region in a near-field region, in which the region may correspond to the surface of the method. The method 750 may include determining 751 a propagation direction for transmit radio frequency (RF) signals relative to the radio communication device, determining 752 an orientation for a surface representative of a human body part relative to the propagation direction, and arranging 753 the antenna for RF signal transmissions in the propagation direction based on a tangential component of an electric field to be induced by the antenna, wherein the tangential component is a component of the electric field that is parallel to the determined orientation.

In accordance with various aspects provided herein, the antenna that is to be arranged for a radio communication device may be an antenna that is configured for a radio communication technology to transmit radio communication signals received from an RF circuit of the radio communication device according to a predefined configuration. Arranging the antenna to reduce absorption of radiated radio waves at a predetermined SAR-sensitive region (e.g. via reducing or minimizing the tangential component of an electric field incident to the SAR-sensitive region) may include various operations to arrange the antenna with the predefined configuration.

In some examples, the antenna may be associated with a particular tangential component characteristic designated for the antenna. The designated tangential component characteristic may be any suitable information representing the behavior of electric fields that the antenna induces during its operation (i.e. electric field information), in particular within the near-field region, such as rotational vector of induced electric fields at one or more distances within the near-field region at one or more directions relative to a radiating element of the antenna. Arranging the antenna to reduce absorption of radio waves at a predetermined SAR-sensitive region may include performing calculations to reduce or minimize the tangential component of an electric field incident to the SAR-sensitive region based on the electric field information.

Figure 8:
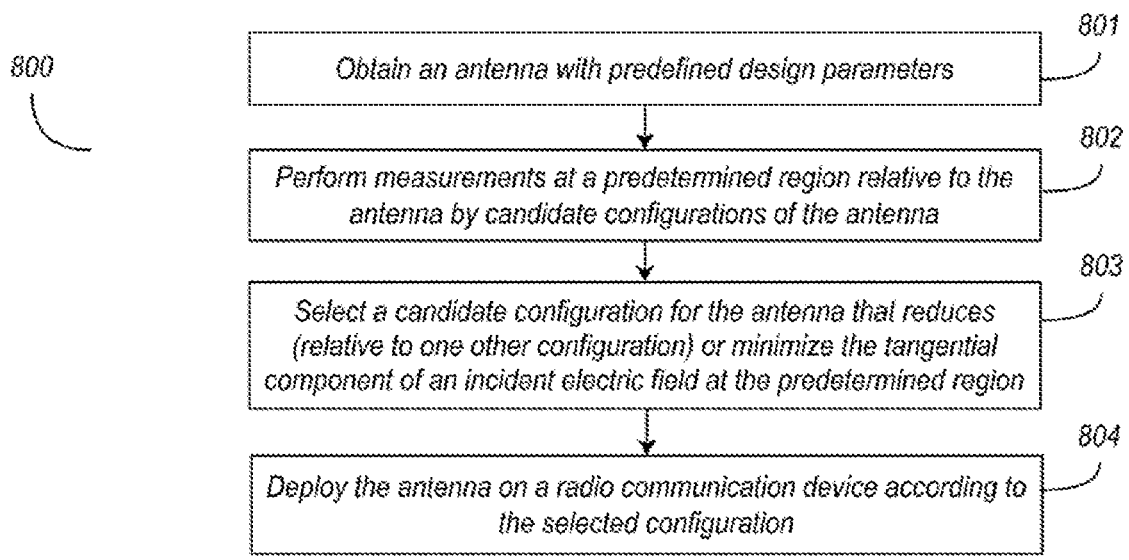
FIG. 8 shows an example of a procedure to arrange an antenna for transmitting RF signals.

FIG. 8 shows an example of a procedure to arrange an antenna for transmitting RF signals. The procedure 800 may include obtaining 801 an antenna with predefined design parameters. The predefined design parameters of the antenna may include suitable antenna characteristics that are determined to perform RF signal transmissions according to far-field constraints designated for the RF communication (e.g. radiation characteristics, such as radiation pattern, gain, relative location of the receiver, etc.).

The procedure 800 may further include performing 802 measurements at a predetermined region relative to the radiating element of the antenna. The predetermined region may be a region designated as a SAR-sensitive region determined, at which a reduction of SAR is desired. Each performed measurement may include a designated antenna configuration (e.g. a candidate configuration) that may be different from antenna configurations of other measurements.

Each antenna configuration may include a different spatial structure of the antenna arranged under consideration of far-field characteristics of transmitted radio waves. For example, each antenna configuration may include a particular orientation of the antenna. The orientations may be relative to the predetermined region, relative to a receiver radio communication device that is positioned according to the predefined design parameters, or relative to at least one direction in which the radio waves are to be radiated. It is to be considered that orientations may be configured to maintain a suitable signal power at the receiver (i.e. communication performance constraints), and under any constraints (e.g. physical constraints for the space which the antenna is to be deployed, size and relative location of the predetermined region, etc.).

The procedure 800 may further include selecting 803 one of the candidate configurations for the antenna that reduces the tangential component of an electric field that is incident to the predetermined region. The reduction at the tangential component may be relative to a tangential component of another configuration. Exemplarily, the measurements may include measuring electric field at the predetermined region. An electric field measurement device may be positioned at the predetermined region at a propagation direction of the antenna at a designated angle to the propagation direction. Accordingly, the measurements may include calculating the tangential component of the electric field based on measured magnitude of the electric field incident at the designated angle. Based on the calculated tangential components of electric fields incident at the predetermined region for multiple candidate configurations, the procedure 800 may include selecting one of the candidate configurations that has a lower tangential component electric field measurement than at least one other candidate configuration. In various examples, the procedure 800 may include selecting the candidate configuration that has the lowest tangential component of the incident electric field. The procedure 800 may further include deploying 804 the antenna to the respective radio communication device according to the selected configuration.

Figure 9:
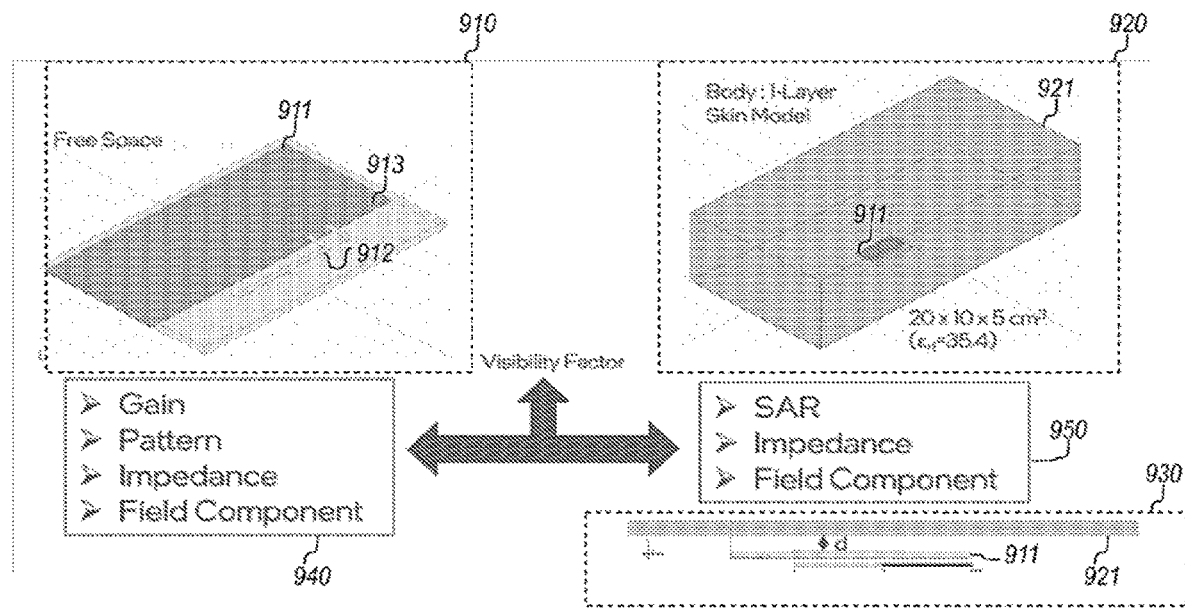
FIG. 9 shows an illustration associated with an exemplary simulation environment for arranging an antenna.

FIG. 9 shows an illustration associated with an exemplary simulation environment for arranging an antenna, illustrating a free space environment 910 (i.e. no human body part within proximity) for an antenna 911 (e.g. an inverted F antenna) including a radiating element 912 and a ground plane 913. The illustration may further include a 3D illustration of an environment 920 in which a human body part space 921 (i.e. a volume of 20×10×5 cm$^3$ with a predefined human-body part permittivity (e.g. 35.4)) is defined for the antenna 911. Furthermore, the illustration includes a two dimensional slice of the environment to illustrate the distance between the radiating element 912 of the antenna 911 and the human body part space 921.

The antenna 911 may have designated characteristics 940 (e.g. particular design parameters) such as gain, radiation pattern, impedance, and field components (e.g. induced electric fields). In particular, the antenna 911 may be configured for WLAN communication signals at 5.5 GHZ, and accordingly the designated characteristics 940 may have been selected for such a WLAN antenna. In 920, the simulation may include at the human body part proximity and given distance d, using an homogenous 1-layer skin body model with dimensions sufficiently large to emulate the human body presence. This simulation may allow to determine various parameters such as SAR/PD and field components 950 at body proximity.

Exemplarily, arranging the antenna in accordance with various aspects provided in this disclosure may include a usage of simulation environments similar to as provided in 910, 920, 930 to perform simulated measurements. By performing SAR/PD and/or electric field component measurements for multiple antenna configurations, an antenna configuration for the antenna 911 may be determined.

Figure 10:
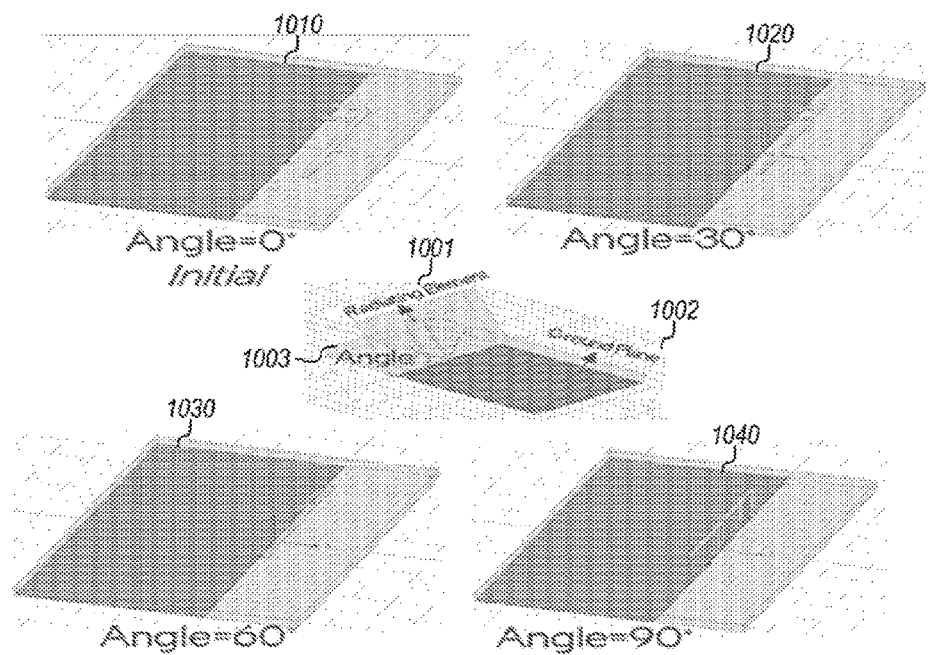
FIG. 10 shows an exemplary illustration representing spatial modifications to an antenna to optimize electric fields in accordance with various aspects of this disclosure.

FIG. 10 shows an exemplary illustration representing spatial modifications to an antenna to optimize electric fields in accordance with various aspects of this disclosure. The antenna may include the antenna 911 provided for FIG. 9. The antenna includes a radiating element 1001 positioned with a designated angle 1003 to a ground plane 1002. Each antenna configuration associated for a measurement (e.g. a simulated measurement) may have a particular spatial structure for the antenna. In this illustration, different spatial structures for different antenna configurations includes different angles (i.e. orientation) of the radiating element of the antenna relative to the ground plane of the antenna. In particular, a first configuration 1010 shows an antenna configuration in which the angle 1003 between the radiating element 1001 and the orientation of the ground plane 1002 is zero, a second configuration 1020 shows an antenna configuration in which the angle 1003 between the radiating element 1001 and the orientation of the ground plane 1002 is 30 degrees, a third configuration 1030 shows an antenna configuration in which the angle 1003 between the radiating element 1001 and the orientation of the ground plane 1002 is 60 degrees, and a fourth configuration 1010 shows an antenna configuration in which the angle 1003 between the radiating element 1001 and the orientation of the ground plane 1002 is 90 degrees.

Figure 11A:
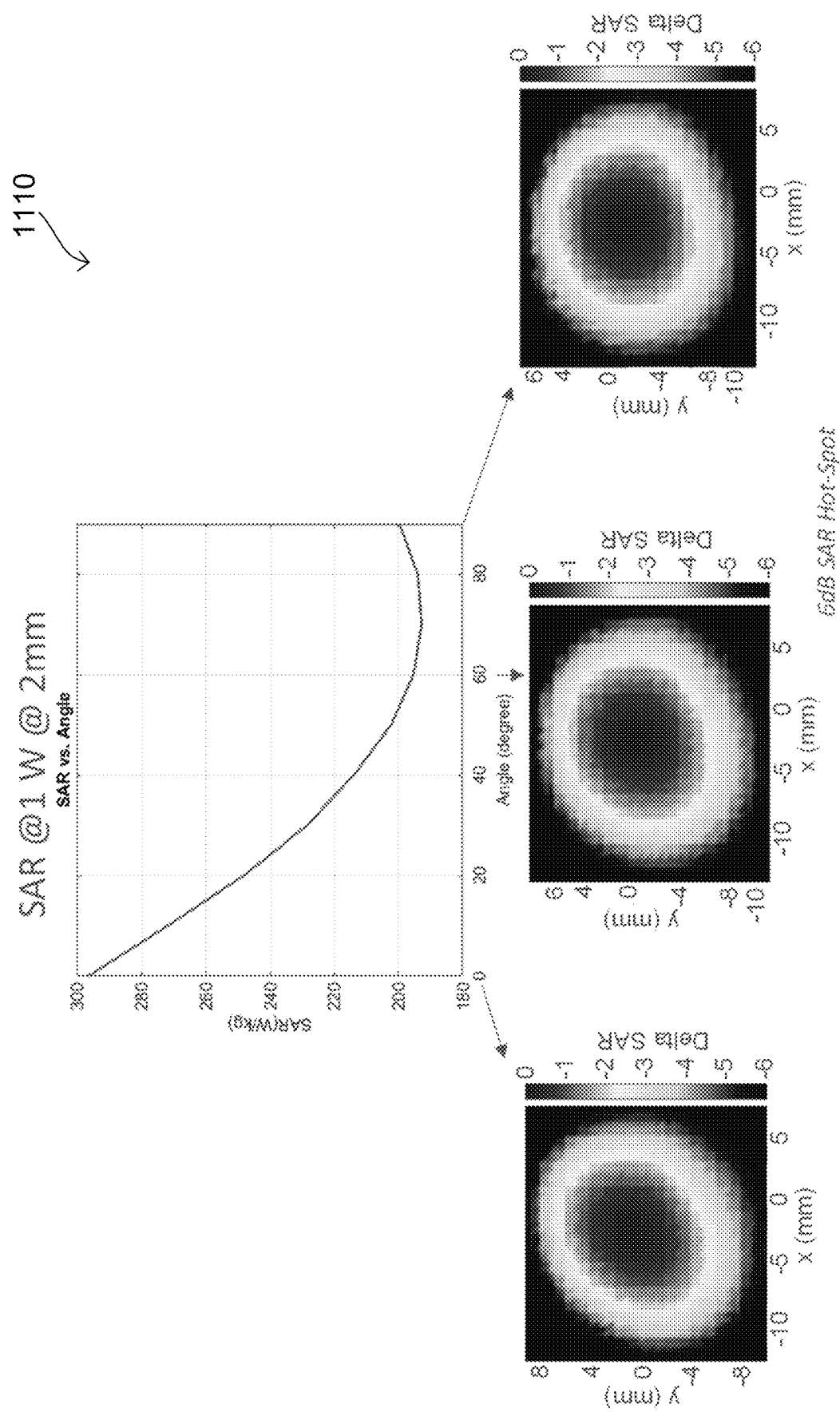
FIGS. 11A-11C show an exemplary illustration of simulation results.
Figure 11B:
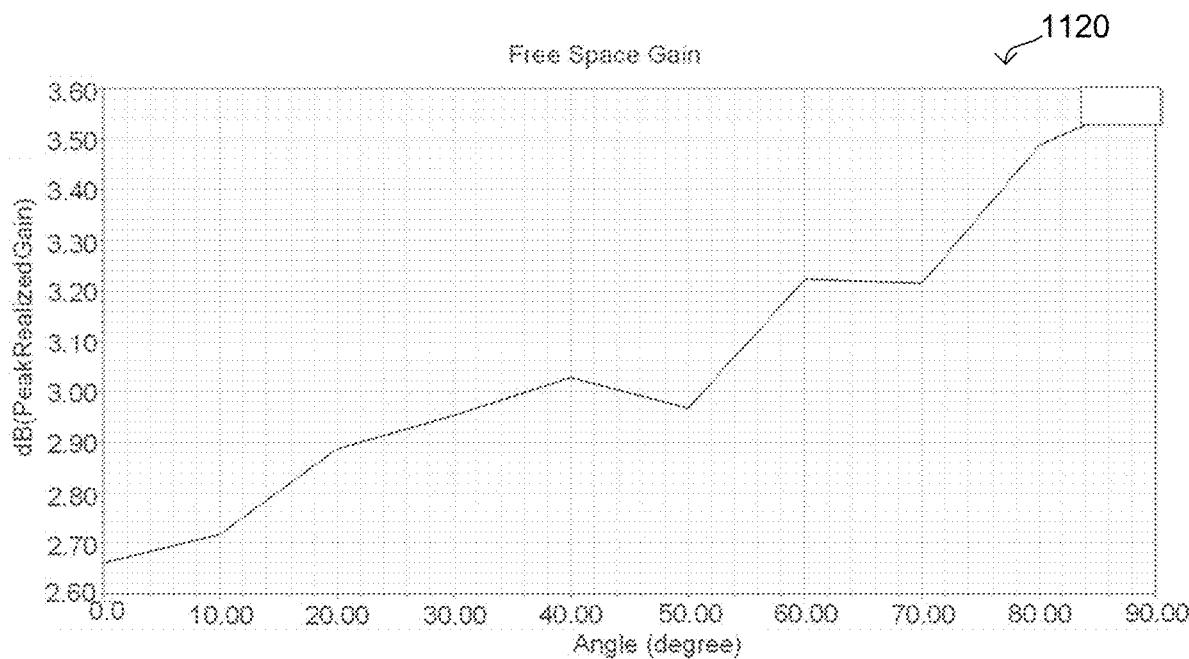
Figure 11C:
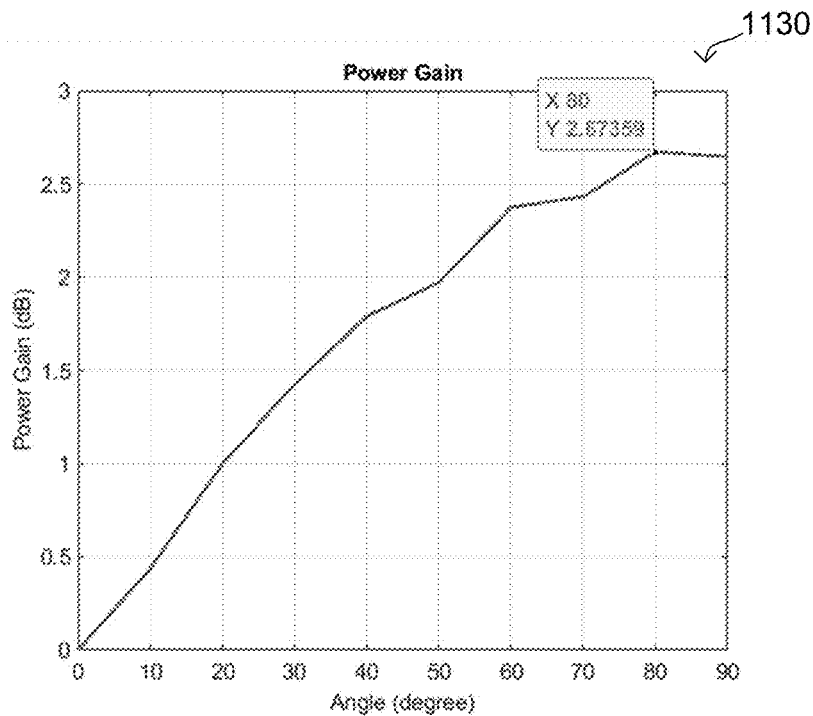

FIGS. 11A-11C show an exemplary illustration of simulation results in particular within the context provided in accordance with FIG. 9 and FIG. 10. Simulation results include a first graph 1110 representing SAR measurements (W/kg) for the human body part space 921 at the distance of 2 mm for antenna configurations between 0 degree angle 1003 between the radiating element 1001 and the ground plane 1002 and 90 degrees angle 1003 between the radiating element 1001 and the ground plane 1002. Second graph 1120 illustrates free space gain of the antenna in dB for the antenna configurations and third graph 1130 illustrates power gain of the antenna in dB relative to the initial antenna configuration with 0 degree angle 1003.

It can be seen that the measured SAR values decrease with angle 1003 increase and reach a minimum at around 80 degree then it starts to re-increase. The amount of maximum SAR reduction is around 2 dB when going from the initial design (Angle 1003 is 0 degree) to an optimized design with Angle 1003 is 80 degrees. At the same time the antenna gain increases by around 1 dB. This may lead to a power optimization budget of 3 dB (i.e. half of power optimized) due to the antenna configuration. In 1130, the total power budget optimization is shown confirming a maximum optimization of around 3 dB at 80 degree angle.

Figure 12:
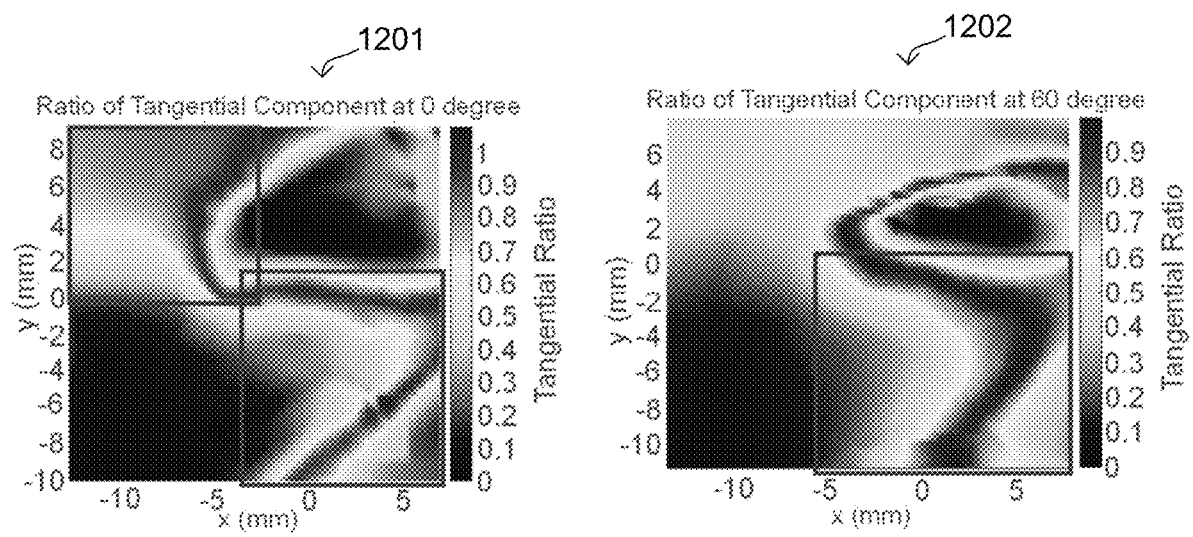
FIG. 12 illustrates two exemplary graphs representing incident tangential electric field ratios for two antenna configurations.

FIG. 12 illustrates two exemplary graphs representing incident tangential electric field ratios for two antenna configurations. The first graph 1201 illustrates the distribution of the ratios of tangential components of incident electric fields at the surface of the human body part space 921 facing the antenna 901 configured with the angle 1003 of 0 degrees between the radiating element 1001 and the ground plane 1002, and the second graph 1202 illustrates the distribution of the ratios of tangential components of incident electric fields at the surface of the human body part space 921 facing the antenna 901 configured with the angle 1003 of an optimized arrangement of the antenna (e.g. 60 degrees) between the radiating element 1001 and the ground plane 1002. It is to be noted that each provided ratio may represent the ratio of tangential component of the incident electric field to normal component of the incident electric field (i.e. a ratio 0 represents that the incident electric field is perpendicular to the surface (i.e. no tangential component) and a ratio 1 represents that the incident electric field is parallel to the surface (i.e. no normal component). It can be seen that with the angle increase the regions with high tangential components (ratios closer to 1) are reduced.

Figure 13:
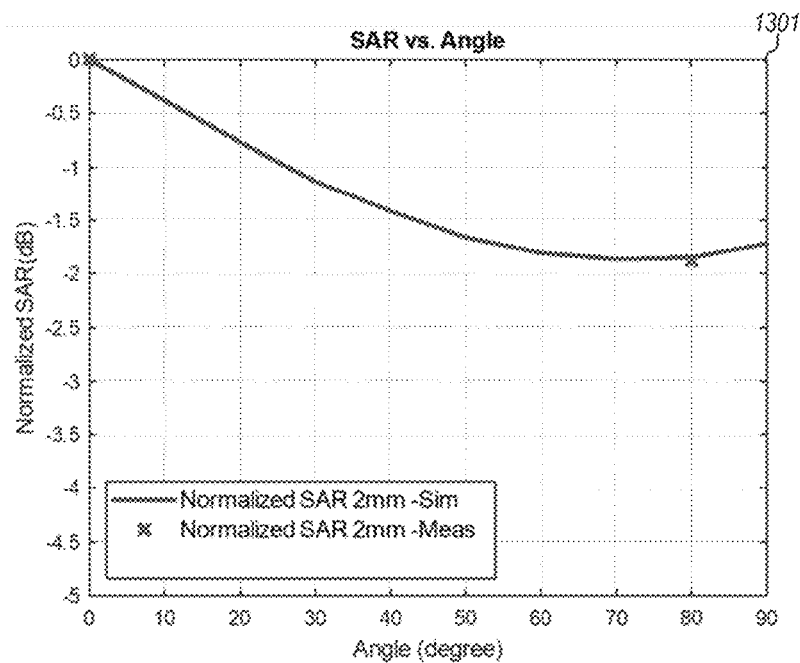
FIG. 13 shows a graph for a performed SAR measurement.

FIG. 13 shows a graph for a performed SAR measurement. Performed measurement is, in parallel to FIGS. 9-12, for antenna is a SAR measurement (a normalized SAR measurement in dB relative to the initial antenna configuration with 0 degree angle) for a test sample at the distance of 2 mm for an antenna configuration with 80 degrees angle 1003 between the radiating element 1001 and the ground plane 1002 in an official certification test system marked with x within the graph 1301. The graph 1301 further includes the simulated measurement results for the exemplary simulation provided in accordance with FIGS. 9-12. It is seen that a correlation between simulation and measurement is present and consequently the power optimization value found in the simulation may validate the findings conceptually.

In accordance with various aspects provided in this disclosure, a radio communication device may include an RF transmitter configured to provide RF signals to perform radio communication operations and an antenna coupled to the RF transmitter to transmit provided RF signals. The antenna may be arranged as provided in this disclosure according to a SAR-sensitive region to reduce SAR/PD to be absorbed by the SAR-sensitive region. The arrangement may cause the antenna to induce electric fields of RF signals transmitted at a propagation direction such that tangential components of electric fields incident to a surface of the SAR-sensitive region in the propagation direction are reduced or minimized. Accordingly, the antenna may be arranged such that the magnitude of the tangential component of an induced electric field is set according to a designated orientation at the propagation direction. In various examples, the antenna may be arranged such that the magnitude of the tangential component of an induced electric field that is incident to a surface oriented according to the designated orientation is set according to the designated orientation. The surface may be within the near-field region of the antenna. The tangential component of the induced electric field that incident to the surface may be referred to as the incident electric field to the surface.

The antenna may include a radiating element to induce electric fields and an attenuating element configured to attenuate the tangential component of the incident electric field to the surface is attenuated. The attenuating element may be configured to attenuate the induced electric field, such that the tangential component of the incident electric field to the surface is attenuated more than the normal component of the incident electric field. The RF transmitter may be configured to provide an amplification to the RF signals to compensate the attenuation. Accordingly, the tangential component of the induced electric field and/or the tangential component of the incident electric field to the surface is to be reduced or minimized. In various aspects, the minimization may further be based on a predefined magnitude threshold. The antenna may be configured with an optimization procedure (e.g. the procedure 800 or any other methods provided herein for arranging the antenna). The antenna may have a modified spatial structure of radiating elements in comparison with an initial antenna before the optimization procedure.

The following examples pertain to further aspects of this disclosure.

In example 1, the subject matter includes a method for arranging an antenna of a radio communication device, the method may include determining radiation characteristics for a far-field region of the antenna, controlling electromagnetic field distributions at a region in a near-field region of the antenna to optimize RF radiation at the region, determining an antenna configuration based on the control of the electromagnetic field distributions, and arranging the antenna based on the determined antenna configuration.

In example 2, the subject matter of example 1 may further include that the radiation characteristics for the far-field region comprises at least one of a gain of the antenna, an efficiency of the antenna, a radiation pattern of the antenna. In example 3, the subject matter of example 1 or example 2 may further include: optimizing at least one of electric field, magnetic field, specific absorption rate, or power distribution at the region.

In example 4, the subject matter of any one of examples 1 to 3 may further include determining a propagation direction for transmit radio frequency (RF) signals relative to the radio communication device; determining an orientation for a surface corresponding to the region that may be representative of a human body part relative to the propagation direction; arranging the antenna for RF signal transmissions in the propagation direction based on a tangential component of an electric field to be induced by the antenna, can optionally include that the tangential component is a component of the electric field that is parallel to the determined orientation at the surface.

In example 5, the subject matter of example 4, may further include: determining the orientation for the surface that is within near-field zone of the antenna. In example 6, the subject matter of example 4 or example 5, can optionally include that the arranging the antenna based on the determined orientation further includes attenuating the tangential component of the induced electric field. In example 7, the subject matter of example 6, can optionally include that the arranging the antenna based on the determined orientation further includes amplifying the RF signal based on a determined attenuation of the tangential component of the induced electric field.

In example 8, the subject matter of any one of examples 4 to 7, may further include arranging the antenna such that the tangential component of the induced electric field is minimized. In example 9, the subject matter of example 8, can optionally include that the tangential component of the induced electric field is minimized based on a predefined magnitude threshold. In example 10, the subject matter of any one of examples 4 to 9, can optionally include that the arranging the antenna based on the determined orientation further includes performing a plurality of specific absorption rate (SAR) or power density (PD) measurements for a measurement surface provided according to the determined orientation at a distance for a plurality of antenna configurations; and selecting an antenna configuration from the plurality of antenna configurations based on results of the plurality of SAR measurements or PD measurements.

In example 11, the subject matter of example 10, can optionally include that the arranging the antenna based on the determined orientation further includes: performing a plurality of signal power measurements of RF signals transmitted by the antenna for the plurality of antenna configurations; and selecting the antenna configuration from the plurality of antenna configurations based on results of the plurality of signal power measurements. In example 12, the subject matter of example 11, can optionally include that each antenna configuration causes the antenna to induce an electric field having a tangential component that is different from an induced electric field of another antenna configuration of the plurality of antenna configurations.

In example 13, the subject matter of any one of examples 4 to 12, can optionally include that arranging the antenna based on the determined orientation includes modifying spatial structure of radiating elements of the antenna based on the determined orientation. In example 14, the subject matter of example 13, can optionally include that the modifying the spatial structure of the radiating elements includes changing the positioning the radiating elements relative to the surface. In example 15, the subject matter of example 14, can optionally include that the modifying the spatial surface of the radiating elements includes rotating the radiating elements relative to the surface.

In example 16, the subject matter of any one of examples 4 to 15, can optionally include that arranging the antenna based on the determined orientation includes arranging dimensions of radiating elements of the antenna. In example 17, the subject matter of example 16, can optionally include that the arranging dimensions of the radiating elements of the antenna further includes tuning antenna dimensions based on one or more optimization targets to cause the tangential component of the induced electric field to reduce at a predefined distance from the antenna. In example 18, the subject matter of any one of examples 4 to 17, can optionally include that the arranging the antenna based on the determined orientation includes causing the antenna to radiate such that a combination of normal components of incident electric fields at a surface area oriented according to the determined orientation is greater than a combination of tangential components of incident electric fields at the surface area.

In example 19, the subject matter includes a radio communication device that may include: an RF transmitter configured to provide radio frequency (RF) signals; an antenna coupled to the RF transmitter, can optionally include that the antenna is configured to: transmit provided RF signals at a propagation direction relative to a radiating element of the antenna; induce an electric field may include a normal component that is perpendicular to a predetermined orientation relative to the propagation direction at a distance and a tangential component that is parallel to the predetermined orientation at the distance, can optionally include that the magnitude of the tangential component is set (or optimized) based on the predetermined orientation and optionally based on the distance.

In example 20, the subject matter of example 19, can optionally include that the predetermined orientation is determined for a surface representative of a human body part relative to the propagation direction. In example 21, the subject matter of example 20, can optionally include that the surface is within near-field zone of the antenna. In example 22, the subject matter of any one of examples 19 to 21, can optionally include that the antenna further includes an attenuating element configured to attenuate the tangential component of the induced electric field. In example 23, the subject matter of example 22, can optionally include that the RF transmitter further includes an amplifier to output the RF signals and a controller configured to control the gain of the amplifier based on attenuation of the tangential component of the induced electric field.

In example 24, the subject matter of any one of examples 19 to 23, can optionally include that the antenna is further configured to minimize the tangential component of the induced electric field. In example 25, the subject matter of example 24, can optionally include that the tangential component of the induced electric field is minimized based on a predefined magnitude threshold. In example 26, the subject matter of any one of examples 19 to 25, can optionally include that antenna is configured based on an optimization procedure may include a performance of a plurality of specific absorption rate (SAR) measurements or PD measurements for a measurement surface provided according to the predetermined orientation at the distance for a plurality of antenna configurations and a selection of an antenna configuration from the plurality of antenna configurations based on results of the plurality of SAR measurements or PD measurements.

In example 27, the subject matter of example 26, can optionally include that the optimization procedure further includes a performance of a plurality of signal power measurements of RF signals transmitted by the antenna for the plurality of antenna configurations, and a selection of the antenna configuration from the plurality of antenna configurations based on results of the plurality of signal power measurements. In example 28, the subject matter of example 27, can optionally include that each antenna configuration includes an antenna configuration that causes the antenna to induce an electric field having a tangential component that is different from an induced electric field of another antenna configuration of the plurality of antenna configurations.

In example 29, the subject matter of any one of examples 19 to 28, can optionally include that the antenna includes a modified spatial structure of radiating elements of the antenna based on the predetermined orientation. In example 30, the subject matter of any one of examples 19 to 29, can optionally include that dimensions of radiating elements are configured to cause the antenna to induce the electric field such that the magnitude of the normal component is greater than the magnitude of the tangential component. In example 31, the subject matter of example 30, can optionally include that the dimensions are determined based on one or more optimization targets to cause the tangential component of the induced electric field to reduce at the distance from the antenna.

In example 32, the subject matter of any one of examples 19 to 21, can optionally include that the antenna is configured to cause the radiating element to radiate such that a combination of normal components of incident electric fields at a surface area oriented according to the determined orientation is greater than a combination of tangential components of incident electric fields at the surface area.

In example 33, a method may include determining a direction for RF signals to be transmitted relative to a radio communication device, determining an orientation and a distance for a surface representative of a human body part relative to the direction, configuring the antenna to transmit RF signals in the direction based on a tangential component of an electric field to be induced by the antenna that is incident to the surface, wherein the tangential component is a component of the electric field that is parallel to the determined orientation at the surface. In example 34, the method of example 33 may further include aspects provided in this disclosure, in particular aspects in examples 2 to 18.

In example 35, a radio communication device may include: an RF transmitter and an antenna coupled to the RF transmitter, wherein the antenna is configured to: transmit RF signals at a propagation direction relative to a radiating element of the antenna, wherein the transmitted RF signals cause an electric field at a distance relative to the radiating element, wherein the electric field comprises a normal component that is perpendicular to a predetermined orientation relative to the propagation direction at the distance and a tangential component that is parallel to the predetermined orientation at the distance, wherein the magnitude of the tangential component is set based on the predetermined orientation and the distance. In example 36, the method of example 35 may further include aspects provided in this disclosure, in particular aspects in examples 19 to 32.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]

") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" or "processing circuitry" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHZ, 5 GHZ, and/or 6-7 GHZ. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method. All acronyms defined in the above description additionally hold in all claims included herein.

What is claimed is:

1. A method for arranging an antenna of a radio communication device, the method comprising:
    determining radiation characteristics for a far-field region of the antenna;
    determining a propagation direction for transmit radio frequency (RF) signals relative to the radio communication device;
    determining an orientation for a surface corresponding to a region in a near-field region of the antenna; and
    arranging the antenna for RF signal transmissions in the propagation direction based on a tangential component of an electric field to be induced by the antenna, wherein the tangential component is a component of the electric field that is parallel to the determined orientation at the surface.

2. The method of claim 1, wherein the radiation characteristics for the far-field region comprises at least one of a gain of the antenna, an efficiency of the antenna, a radiation pattern of the antenna.

3. The method of claim 1, further comprising:
    optimizing at least one of electric field, magnetic field, specific absorption rate, or power distribution at the region.

4. The method of claim 1,
    wherein the surface is representative of a human body part relative to the propagation direction.

5. The method of claim 1, further comprising:
    determining the orientation for the surface that is within near-field zone of the antenna.

6. The method of claim 5,
    wherein the arranging the antenna further comprises attenuating the tangential component of the induced electric field.

7. The method of claim 6,
    wherein the arranging the antenna further comprises amplifying the RF signal based on a determined attenuation of the tangential component of the induced electric field.

8. The method of claim 1, further comprising:
    arranging the antenna such that the tangential component of the electric field is minimized.

9. The method of claim 1,
    wherein the arranging the antenna further comprises:
    performing a plurality of specific absorption rate (SAR) measurements for a measurement surface provided according to the determined orientation at a distance for a plurality of antenna configurations; and
    selecting an antenna configuration from the plurality of antenna configurations based on results of the plurality of SAR measurements.

10. The method of claim 9,
    wherein the arranging the antenna further comprises:
    performing a plurality of signal power measurements of RF signals transmitted by the antenna for the plurality of antenna configurations; and
    selecting the antenna configuration from the plurality of antenna configurations based on results of the plurality of signal power measurements.

11. The method of claim 10,
    wherein each antenna configuration causes the antenna to induce an electric field having a tangential component that is different from an induced electric field of another antenna configuration of the plurality of antenna configurations.

12. The method of claim 1,
wherein arranging the antenna comprises modifying spatial structure of radiating elements of the antenna based on the determined orientation.

13. The method of claim 12,
wherein the modifying the spatial structure of the radiating elements comprises changing positioning of the radiating elements relative to the surface.

14. The method of claim 13,
wherein the modifying the spatial structure of the radiating elements comprises rotating the radiating elements relative to the surface.

15. The method of claim 14,
wherein arranging the antenna comprises arranging dimensions of radiating elements of the antenna.

16. The method of claim 15,
wherein the arranging dimensions of the radiating elements of the antenna further comprises tuning antenna dimensions based on one or more optimization targets to cause the tangential component of the induced electric field to reduce at a predefined distance from the antenna.

17. The method of claim 1, further comprising:
using an algorithm to determine dimensions of the antenna based on predefined optimization targets for minimization of electromagnetic field components at the region.

18. A radio communication device comprising:
an RF transmitter configured to provide radio frequency (RF) signals; and
an antenna coupled to the RF transmitter, wherein the antenna is configured to:
  transmit provided RF signals at a propagation direction relative to a radiating element of the antenna; and
  induce an electric field comprising a normal component that is perpendicular to a predetermined orientation relative to the propagation direction at a distance and a tangential component that is parallel to the predetermined orientation at the distance, wherein a magnitude of the tangential component is optimized based on the predetermined orientation.

19. The radio communication device of claim 18,
wherein the predetermined orientation is determined for surface representative of a human body part relative to the propagation direction.

20. The radio communication device of claim 19,
wherein the surface is within near-field zone of the antenna.

* * * * *